United States Patent [19]

Pujari et al.

[11] Patent Number: 5,571,760
[45] Date of Patent: Nov. 5, 1996

[54] SILICON NITRIDE HAVING A HIGH TENSILE STRENGTH

[75] Inventors: Vimal K. Pujari, Northboro; Dennis M. Tracey, Medfield; Michael R. Foley; Norman I. Paille, both of Oxford; Paul J. Pelletier, Millbury; Lenny C. Sales, Grafton; Craig A. Willkens, Sterling; Russell L. Yeckley, Oakham, all of Mass.

[73] Assignee: Saint-Gobain/Norton Industrial Ceramics Corporation, Worcester, Mass.

[21] Appl. No.: 324,937

[22] Filed: Oct. 18, 1994

Related U.S. Application Data

[62] Division of Ser. No. 113,477, Aug. 27, 1993, abandoned.

[51] Int. Cl.$^6$ .................................................. C04B 35/587
[52] U.S. Cl. .................................................. 501/97
[58] Field of Search .................................................. 501/97

[56] References Cited

U.S. PATENT DOCUMENTS

| | | | |
|---|---|---|---|
| 4,097,293 | 6/1978 | Komeya et al. | 106/43 |
| 4,113,830 | 9/1978 | Mazdiyasni et al. | 501/97 |
| 4,225,356 | 9/1980 | Prochazka et al. | 501/97 |
| 4,535,063 | 8/1985 | Matsuhiro et al. | 501/97 |
| 4,879,263 | 11/1989 | Komeya et al. | 501/97 |
| 4,883,776 | 11/1989 | Pizik et al. | 501/97 |
| 5,015,608 | 5/1991 | Matsuhisa et al. | 501/97 |
| 5,017,531 | 5/1991 | Ukai et al. | 501/97 |
| 5,045,513 | 9/1991 | Mizuno et al. | 501/97 |
| 5,098,740 | 3/1992 | Tewari | 427/215 |
| 5,098,872 | 3/1992 | Suyama et al. | 501/97 |
| 5,217,931 | 6/1993 | Takami et al. | 501/97 |
| 5,369,065 | 11/1994 | Yoshimura et al. | 501/97 |
| 5,382,273 | 1/1995 | Mehrotra et al. | 501/98 |
| 5,384,292 | 1/1995 | Matsui et al. | 501/98 |

FOREIGN PATENT DOCUMENTS

| | | | |
|---|---|---|---|
| 178169 | 4/1986 | European Pat. Off. | F16C 33/04 |
| 258845 | 3/1988 | European Pat. Off. | F16C 33/62 |

OTHER PUBLICATIONS

Yamada et al. "Analysis of Fracture Strength of $Si_3N_4$ Using Weibull's Multi–Modal Distrubution" J. Amer. Cer. Soc., vol. 100 pp. 1231–1235, 1992.

Toshiba Corporation, FIne Ceramics Division, Inspection Results March 15, 1993.

K. Komeya and H. Kotani, "Development of a ceramic antifriction bearing", Int. J. of Materials and Product Technology, vol. 3, No. 1, 1988, Printed in UK, pp. 54–67 (no month).

Aleksander J. Pyzik and Donald R. Beaman, "Microstructure and Properties of Self–Reinforced Silicon Nitride", J. Am. Ceram. Soc., vol. 76, No. 11, pp. 2737–2744 1993 (no month).

V. K. Pujari, K. E. Amin and P. H. Tewari, Norton Company, Advanced Ceramics, Northboro, MA 01532, "Development of Improved Procesing and Evaluation of Silicon Nitride", June 91, American Soc. of Mech. Engineers, 91–GT–317, pp. 1–11.

Vimal K. Pujari and Dennis M. Tracey, Northboro Research and Development Center, Sain–Gobain Norton Industrial Ceramics, Northboro, MA., "Processing Methods for High Reliability Silicon Nitride Heat Engine Components", American Soc. of Mech. Engineers, 93–GT–319, pp. 1–9 May 93.

Michael R. Foley, Proceedings of the 16th Annual Conference on Composites and Advanced Ceramic Materials, January 7–10, 1992, Cocoa Beach, Fl, Ceramic Engineering & Science Proceedings, Jan. 1992, pp. 978–991.

V. K. Pujari, K. E. Amin and P. H. Tewari, Norton Company, Advanced Ceramics, Northboro, MA, "Development of Improved Processing and Evaluation of Silicon Nitride", the 36th ASME International Gas Turbine and Aeroengine Congress and Exposition, June 3–6, 1991, Orlando, Florida.

Dennis M. Tracey, Saint–Gobain/Norton Industrial Ceramics Inc., Northboro, MA, "In–Process Inspection and Control for High Reliability Si3N4", DoE/ORNL, Advanced Ceramic Manufacturing Workshop, Washington, D.C., Sep. 22, 1992.

Ceramic Technology Newsletter, No. 42, Jan.–Mar. 1994, "Allied Signal Works to Commercialize High–Performance Ceramics", pp. 1–12.

Oak Ridge National Laboratory, Oak Ridge, Tennessee, Aug. 31, 1994, "Ceramic Technology Project Bimonthly Technical Progress Report to DOE Office of Transportation Technologies", Jun.–Jul. 1994, D. R. Johnson, Project Manager, Ceramic Technology Project.

*Primary Examiner*—Mark L. Bell
*Assistant Examiner*—David Sample
*Attorney, Agent, or Firm*—Thomas M. DiMauro

[57] ABSTRACT

A silicon nitride ceramic comprising:

a) inclusions no greater than 25 microns in length, b) agglomerates no greater than 20 microns in diameter, and c) a surface finish of less than about 8 microinches, said ceramic having a four-point flexural strength of at least about 900 MPa.

18 Claims, 4 Drawing Sheets

SILICON NITRIDE HAVING A HIGH TENSILE STRENGTH

STATEMENT OF GOVERNMENT SUPPORT

This invention was developed under U.S. Government Contract No. DE-AC05-84OR21400 awarded by The United States Department of Energy.

This is a divisional of application Ser. No. 08/113,477 filed on Aug. 27, 1993 now abandoned.

BACKGROUND OF THE INVENTION

Advanced structural ceramic materials have gained the attention of industry by virtue of their superior performance qualities. These qualities, such as superior high temperature strength, high toughness, resistance to thermal shock and resistance to oxidation provide the basis for their potential use in a variety of applications.

Despite their enormous potential, advanced structural ceramics in general and silicon nitride in particular have yet to capture many markets, principally due to the perception that they tend toward catastrophic failure, and thus are unsuitable for uses in applications requiring high reliability.

While significant progress has been made in the development of strong, tough, refractory ceramics for demanding applications such as the AGT rotor, processing these materials sometimes still introduces strength-limiting and reliability-reducing flaws.

One measure of the extent of the presence of flaws is the tensile strength of the ceramic. Typically, a conventional ceramic material often possesses a tensile strength in the neighborhood of only between about 50% and 90% of its flexural strength. Accordingly, the average tensile strength of conventional silicon nitride materials is often in the range of about 650 to 750 MPa.

Accordingly, it is the object of the present invention to provide a silicon nitride ceramic having an average tensile strength of at least about 800 MPa.

SUMMARY OF THE INVENTION

In accordance with the present invention, there is provided a silicon nitride ceramic having an average tensile strength of at least about 800 MPa, preferably about 900 MPa, more preferably about 1000 MPa. In preferred embodiments, there is provided a process for producing a high tensile strength silicon nitride ceramic, comprising the steps of:

a) milling a batch of silicon nitride powder in water to produce a slurry having a particle size distribution characterized by a d10 of about 0.28 microns, a d50 of about 0.67 microns, and a d90 of about 1.27 microns, b) passing the slurry through a filter having a pore size of between about 2 and about 10 microns, c) concentrating the slurry to a solids content of between about 70 and about 72 w/o, d) passing the slurry through a magnetic separator, e) casting the slurry at a casting rate slope of less than about 10 mm$^2$/min to produce a green body comprising at least about 80 w/o silicon nitride, f) drying the green body to less than about 3 w/o water, g) degassing the green body, h) sintering the green body to yield a dense ceramic comprising at least about 80 w/o silicon nitride, i) machining the dense ceramic, and j) heat treating the dense ceramic to yield a high tensile strength silicon nitride ceramic.

DETAILED DESCRIPTION OF THE INVENTION

Without wishing to be tied to a theory, it is believed that the processing of the present invention results in a silicon nitride body having a very low frequency of flaws. Flaws can be characterized as intrinsic (i.e., flaws occurring randomly within a conventional processing cycle) or extrinsic (i.e., flaws unrelated to conventional processing). Surface glass blisters and volume microstructural flaws (i.e., inclusions, agglomerates and porosity) are considered to be intrinsic flaws since blisters result from oxidation treatments and microstructural flaws arise from imperfect mixing and contamination. Machining damage is considered to be an extrinsic defect since it arises from poorly controlled machining and is not considered part of conventional powder processing, forming or densification.

Again, without wishing to be tied to a theory, it is further believed that the process of the present invention provides a controlled method of producing reliable silicon nitride ceramics by reducing the frequency with which the above-cited flaws arise. In particular, blister generation can be minimized by controlling the oxidizing environment. Porosity can be controlled by deairing the slurry. Inclusions can be lowered by utilizing a process including: a) a Class 10,000 clean room, b) separation of dry powder from the milling area, c) filtered and deionized water, d) magnetic separation, e) filtration of the milled slurry, f) a closed system from milling to casting, g) non-metallic contact surfaces for equipment contacting the silicon nitride slurry, and h) high purity/low attrition hipped milling media. Agglomerates can be reduced by using a fresh, sonicated slip. Finally, machining damage can be controlled by improved machining procedure.

The silicon nitride starting materials may be any silicon nitride powder or precursor thereof typically used in the processing of fine ceramics. However, since it is the object of the present invention to produce a ceramic relatively free of flaws, it is desirable to use highly pure silicon nitride starting materials. Highly pure starting materials include chemically derived silicon nitride powders and preferably, purified native silicon nitride powders. In silicon nitride starting materials of high purity, iron and residual chlorine contamination in the powder should be no more than about 30 ppm and 50 ppm, respectively. There should be no detectable free silicon. More preferably, high purity silicon nitride powder available from Ube Industries of Tokyo, Japan is selected as the silicon nitride starting material.

The oxygen content of the silicon nitride starting materials is typically between about 2.5 w/o and about 3.0 w/o of the silicon nitride starting material. If the oxygen content is no more than about 2.5 w/o, it is typically inhomogeneously distributed within the silicon nitride starting material. Accordingly, these starting materials are often subject to thermal oxidations to produce a more homogeneous oxygen distribution. These treatments typically raise the oxygen content to about 3 w/o.

In especially preferred embodiments, the silicon nitride starting material is a powder blend comprising a first portion having an average particle size of between about 0.60 and about 2.3 microns, a second portion having an average particle size of between about 0.30 and about 1.60 microns, and a third portion having an average particle size of between about 0.20 and about 1.20 microns. This particular blend is preferred because it allows packing density to be easily controlled and optimized. Typically, the first portion is Ube E03, the second portion is Ube E05, and the third portion is Ube E10. Powder blends disclosed in U.S. Pat. No. 5,001,091 may also be suitably used as the starting materials of the present invention.

The phase of the silicon nitride starting material may be alpha, beta or any combination thereof. Preferably, between about 92 w/o and about 98 w/o of the silicon nitride starting material is in the alpha phase. In more preferred embodiments, it is about 95 w/o of the silicon nitride starting material.

The isoelectric point of the silicon nitride starting powder (IEP) is an important process control parameter for the present invention because it controls the casting rate and hence the density and uniformity of the cast body. The isoelectric point of the starting powder should be within the range of about 6.8 to about 7.2 pH units. When the IEP of the powder is outside this range, undesirable casting rates may be realized, resulting in undue density gradients in the cast body.

The production of highly reliable ceramics requires highly homogeneous starting materials. Typically, however, starting materials show significant lot-to-lot particle size variability, with the surface area of starting material powders often varying by about 10% to about 40%. Since there is often a significant variability in starting material particle size, the raw powder lots are milled to achieve a consistent particle size distribution prior to green forming. Depending upon the condition of the as-received powder, milling conditions may have to be varied to arrive at the desired size distribution. Any milling technique, including ball milling, attrition milling and vibration milling, may be used to achieve this purpose. However, since vibration milling provides for continuous monitoring and sampling throughout the milling operation and its low impact forces allow for the milling of low solids content mixes without excessive media wear, it is the preferred mode of milling. In some embodiments, milling is accomplished in a Sweco M18 vibratory mill, manufactured by Sweco, Inc. of Florence, Ky. Preferably, this mill is charged with about 43338 cc of deionized water and about 76 kg of high purity hipped silicon nitride milling media having ½ inch cylindrical bodies with hemispherical ends. The size distribution of milled powders of the present invention is typically characterized by 3 parameters: d10, d50 and d90. These are the proportions which exceed the diameter of exactly 10%, 50% and 90% of the particles within the milled powder. The milled powders of the present invention typically have a d10 of between about 0.24 and about 0.32 microns, preferably about 0.28 microns; a d50 of between about 0.64 and about 0.70 microns, preferably about 0.67 microns; and a d90 of between about 1.17 and 1.37 microns, preferably about 1.27 microns.

In some embodiments, the silicon nitride milling media becomes a component of the milled product due to attrition during milling. This component typically represents between about 0.2 and about 1.0 w/o of the final milled product. The effect of this attrition upon the product of the present invention is typically some nominal increase in cation impurities (i.e. an increase of less than about 100 ppm in cation impurities).

Although a non-aqueous liquid milling medium such as an alcohol may be used in the milling step of the present invention, water is preferably used. It has been found that water milling not only results in about a 30% reduction in milling time as compared to conventional alcohol milling, but also results in less inclusion contamination since there is no need to dry and redisperse (and thereby expose to contamination) the milled powder in water prior to casting. When water is selected as the liquid milling media, however, the potential for oxidation of the silicon nitride starting materials must be considered. Accordingly, it is desirable to use a surfactant in order to enhance powder dispersion and to provide a protective coating on the powder surface which minimizes oxidation of the powder.

Because silicon nitride does not easily sinter by itself, it may be desirable to add sintering aids to the silicon nitride starting materials of the present invention. Rare earth oxides such as yttria may be used in amounts typically used in the art to assist sintering. In some embodiments, yttria powder, manufactured by Molycorp of White Plains, N.Y., is added during the milling operation, preferably in an amount of about 4 w/o of the silicon nitride powder. During co-milling, some amount of undesirable foaming may be observed. Accordingly, about 0.0025 w/o of a defoaming agent such as Mazu DF204, available from PPG Industries of Gurnee, Ill., can be used to mitigate the foaming.

Because the above-described milling operation may not only produce agglomerated silicon nitride starting materials but also introduce contamination into the milled product, it is often desirable to pass the milled product through filters to eliminate these newly-generated agglomerates and contaminants. Preferably, these filters have pore sizes of between about 2 and about 5 microns. Although any filter conventionally used in the filtration of silicon nitride slurries may be used, a cartridge polymer filter is preferred. More preferably, the filter is a 5 micron RIF050 Pall Profile Filter, available from Chisolm Corp. of Cranston, R.I. Typically, filtration can easily remove particles greater than about 10 microns when the milled powder primarily comprises particles less than about one micron. However, when filtration of smaller particles (i.e. less than about 10 microns) is desired, it has been found that the milled product should be diluted with about 30 w/o of deionized water prior to filtration.

Because iron inclusions often reduce the reliability of silicon nitride ceramics, the process of the present invention typically includes a magnetic separation step. In preferred embodiments, the filtered product in the form of a slurry is recirculated through a magnetic separator. In more preferred embodiments, the magnetic separator is Model 43XP Ferrofilter, manufactured by S. G. Frantz of Trenton, N.J. The slurry is usually fed through the magnetic separator at a rate of 2 gallons per minute and recirculated for one hour. There should be no metallic inclusions found in powder dried immediately after it is run through the magnetic separator, as determined by a microfocus x-ray having a detection limit of about 25 microns.

After the slurry is subjected to magnetic separation, it usually has a solids loading of about 30 w/o. Because such a slurry is likely to be too dilute to be effectively cast, a concentration step is typically undertaken. In preferred embodiments of the present invention, the slurry is concentrated to a solids loading of between about 65 and about 74 w/o. Above about 74 w/o, the slurry is thought to be susceptible to dilatency. In preferred embodiments, the concentration step is carried out with a crossflow filter, as described in U.S. Pat. No. 5,229,339, the specification of which is wholly incorporated by reference. The cross flow filter allows the slurry to be concentrated to high (i.e., 65–74 w/o) levels while maintaining suspension rheology (30–70 cP) suitable for casting.

Slips concentrated in accordance with the present invention may sometimes contain agglomerates which can act as flaws. One method of breaking up these agglomerates involves sonicating the slip. Thus, in preferred embodiments, the concentrated slip is sonicated with a 5 kW ultrasonic horn for five minutes. The sonication produces a deagglomerated slurry.

slips processed in accordance with the present invention may also contain air pockets. These air pockets remain throughout casting and produce strength limiting porosity when the cast is sintered. Accordingly, in some embodiments, the sonicated slip is deaired by placing it in a 60 mm Hg vacuum for about 5 minutes.

Once deaired, the slip typically has a viscosity of about 70 cp and a pH of about 9.5. Preferably, the slip has a viscosity of about 60 cp, a pH of about 9.0, and an isoelectric point (IEP) of about 6.8. However, a slip is considered suitable if it has a viscosity of about 60–70 cp and a pH of about 9–10. Because all of these parameters change as the slip ages, care must be taken to process the slip before the parameters significantly change. If excessively aged slip is used, agglomerates typically form. It has been found that the slip should be used within about 5 days of its deairing, preferably within about 3–5 days, in order to prevent agglomerate formation.

In casting green pieces, it is important to have a relatively slow cast. Excessive casting rates provide inadequate time for the optimum packing of the powder particulates during filtration, leading to both low and inhomogeneous cast densities. Accordingly, the slurry of the present invention may be further characterized by its casting rate slope ("CRS"). The CRS of the slurry is defined as the slope of the square of the thickness of a cast body versus time when the slurry is cast under a set of standard conditions. In some embodiments of the present invention, the standard conditions were set at about 200 g of slurry cast at a pressure of about 0.21 MPa onto a Plaster of Paris porous material to produce a 3 inch diameter disc. When the CRS is less than about 10 mm$^2$/min, the cast rate is suitably slow to provide a cast body of high and homogeneous density. Typically, the slurry concentration required for casting is between about 70 w/o and about 72 w/o solids.

In some embodiments of the present invention, slower casting rates (i.e., casting rates between about 2 and about 5 mm$^2$/min) have yielded highly reliable ceramic bodies which do not show excessive warping even when the ceramic has a high aspect ratio. It is believed the slower casting rates may be achieved by using a slurry having a solids content of between about 57 and about 63w/o, preferably about 60 w/o, or a slurry whose d10 is between about 0.25 and about 0.30 microns. Thus, in accordance with the present invention, there is provided an unmachined ceramic body comprising at least about 80 w/o silicon nitride, said ceramic body having a mean tensile strength of at least about 800 MPa, a runout of less than about 30 mil per about 6.8 inches, wherein runout is defined as the depth of bend from a perfectly straight configuration, and an aspect ratio of at least about 3:1.

Once the slip properties (including its CRS) are found to be suitable, the slip is ready to be cast. In preferred embodiments of the present invention, the casting mold is a two piece Plaster of Paris mold having an average pore size of about 2 microns which has been soaked in distilled water for about 2 minutes. In some embodiments, one piece of the mold is Plaster of Paris and the other piece of the mold is plastic. Preferably, the mold has a single casting front. It was found that molds providing a filtration surface wholly around the casting cavity (and thus providing multiple casting fronts) often produced cast pieces which cracked upon drying at the points where casting fronts met. Conversely, molds designs which present a single casting front yielded cast bars which showed no cracking even under uncontrolled, i.e. ambient, drying conditions. Tomographic examination of bars cast under multiple fronts showed a low density at the center of the bars. Conversely, the centers of those bars cast with a single front showed high density.

Figure 1:
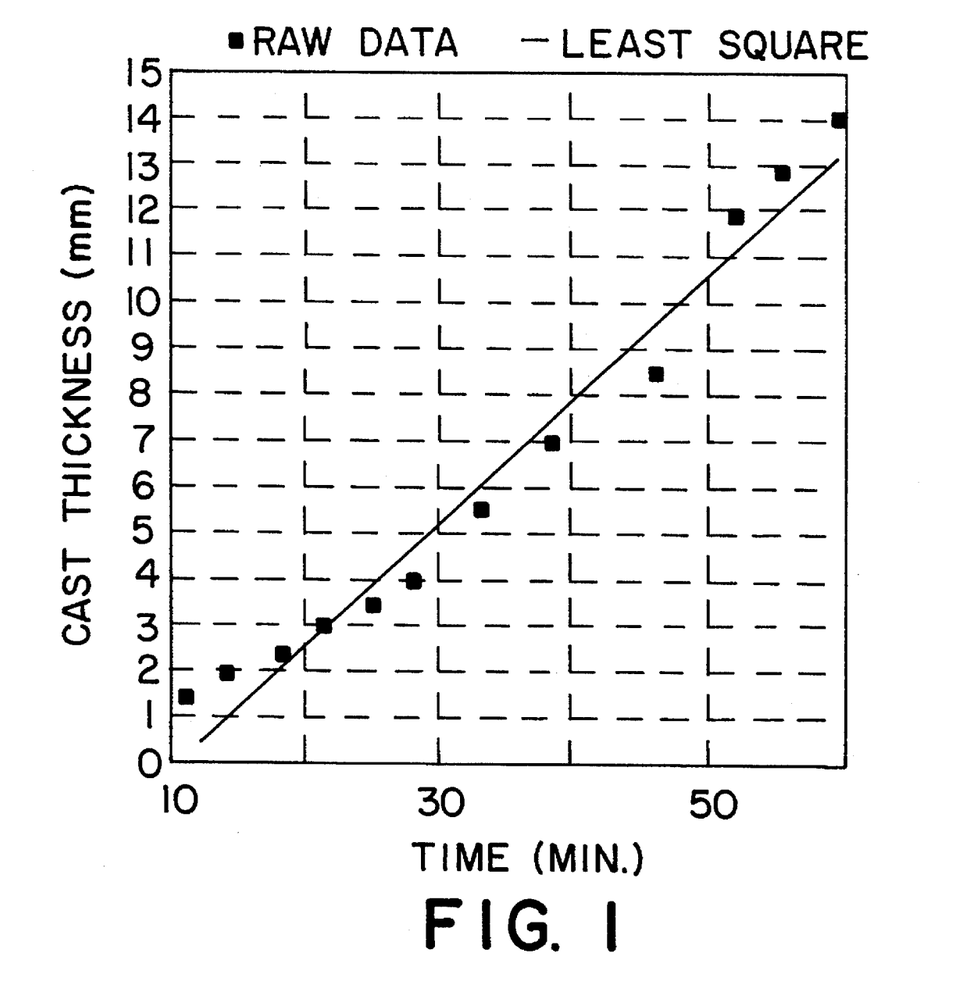
FIG. 1 presents a plot of cast thickness over time produced from a programmed pressure profile of the present invention.

Typically, green bodies are cast under a constant applied pressure of between about 0.1 and about 0.5 MPa. However, permeability changes often arise which threaten the uniform density of a cast body. Accordingly, a variable pressure profile is preferably used to accommodate the permeability change. See FIG. 1. The use of such a profile results in a linear casting rate and hence a uniform density throughout the cast body.

Once the slurry is cast in accordance with the present invention, the resulting green body may be optionally dried. Generally, any standard method of drying may be used, including controlled humidity drying. The humidity of the drying step may be controlled or uncontrolled. Preferably, the dried casting contains no more than about 3 w/o water.

The dried casting may be subjected to a degassing step to remove all chemisorbed species. When degassing is desired, the green body is typically placed in a furnace having a temperature of about 1450° C. and a nitrogen atmosphere for about 60 minutes.

After the casting is degassed, it is sintered to a dense ceramic. Any method of sintering known in the art can be utilized, including hot pressing, pressureless sintering, gas pressure sintering, and hot isostatic pressing ("hipping"). Moreover, conventional sintering times and temperatures may be used. In preferred embodiments of the present invention, the casting is subjected to glass encapsulated hipping in accordance with U.S. Pat. No. 4,446,100. More preferably, the sintering cycle comprises an initial soak of 1840° C. for 20 minutes and a second soak of 1740° C. for about 45 minutes, each soak undertaken at 30,000 psi.

After the sintered ceramic is produced, it often contains a reaction layer and slight dimensional distortion. Hence, machining of the ceramic is usually necessary. In preferred embodiments of the present invention, machining is carried out as per ASTM STANDARD C 1161-90. In other words, the preferred machining process involves wet grinding between centers using a computer numerical control ("CNC") grinding machine, a rough grinding step and a finish grinding step. In the rough grinding step, a resin bonded 180 grit diamond wheel is used to grind the specimen at a 0,001" per pass feed rate, leaving 0.005" stock for finish grinding. In the finish grinding step, a resin bonded, 320 grit diamond wheel is used to grind the specimen at a 0.0002" per pass feed rate. In each step, the wheel speed is 5500–7500 surface feet per minute ("SFM") and the work speed is 50–200 rpm. The resulting ceramic measures a surface roughness of less than about 8 microinches.

Machining of the ceramics of the present invention often produces subsurface flaws in the ceramic typically appearing as half-penny shaped cracks. Accordingly, the machined ceramic must often be heat treated to anneal these flaws. Heat treating the machined ceramic typically requires subjecting it to a temperature of about 1000° C. in an air atmosphere for about 20 hours.

When the process controls described above are incorporated in silicon nitride processing, the resulting ceramics typically have a mean tensile strength of at least about 800 MPa, preferably at least about 900 MPa, and more preferably at least about 1000 MPa, with an associated Weibull Modulus of between about 10 and about 28, a mean flexural strength of between about 900 and about 1000 MPa, and a toughness of between about 5.5 and about 6.4 MPa m$^{1/2}$. In some embodiments, the tensile strength of a ceramic of the present invention is characterized by a 3-parameter Weibull Modulus having a cutoff of at least about 665 MPa, and is typically at least about 95% to 105% of its flexural strength.

Further, the inclusions are typically less than about 25 microns in length while the agglomerates are typically less than about 20 microns in diameter.

Between about 20 v/o and about 30 v/o of the silicon nitride grains are typically alpha phase, the remainder being in the beta phase. It was observed that when between about 20 w/o and about 30 w/o of the silicon nitride grains in the ceramic are in the alpha phase, toughness is enhanced. Without wishing to be tied to a theory, it is believed that an abbreviated sintering cycle produces this phenomenon. In typical sintering cycles, alpha phase grains transform to long, thin, high aspect ratio beta phase grains which then coarsen to lower aspect ratios as sintering progresses. Moreover, transformation does not occur in each grain simultaneously. Thus, transformed grains typically coarsen before all alpha phase grains are completely transformed. Since conventional sintering theory teaches to continue sintering until all the alpha phase grains are transformed, typical sintering cycles produce ceramic having predominantly low aspect ratio beta grains and essentially no alpha grains. However, it has been found that high aspect ratio beta grains are superior toughening agents to lower aspect ratio coarse beta grains. Accordingly, it is believed that abbreviated sintering schedules which proceed far enough to transform alpha grains to high aspect ratio beta grains, but not so far as to substantially coarsen the beta grains, will provide an enhanced toughness material. Such abbreviated sintering cycles typically include a soak stage wherein the green body is hipped at a temperature of between about 1800° and about 1840° C. for between about 15 and about 30 minutes, preferably at a pressure of about 30,000 psi. A second soak stage may optionally be added wherein the green body is hipped at a temperature of between about 1700° and about 1780° C. for between about 30 and about 180 minutes, preferably at between about 1740° and about 1760° C. for between about 30 and about 60 minutes. It has been observed that such abbreviated cycles which maximize the frequency of high aspect ratio beta grains typically fail to transform between about 20 and about 30 w/o of the alpha grains present in the presintered body. In the ceramics produced from such abbreviated cycles, at least about 80% the beta grains have a thickness less than about 1 micron and at least about 95% of the beta grains typically have an aspect ratio of at least about 4.

EXAMPLE I

Figure 2:
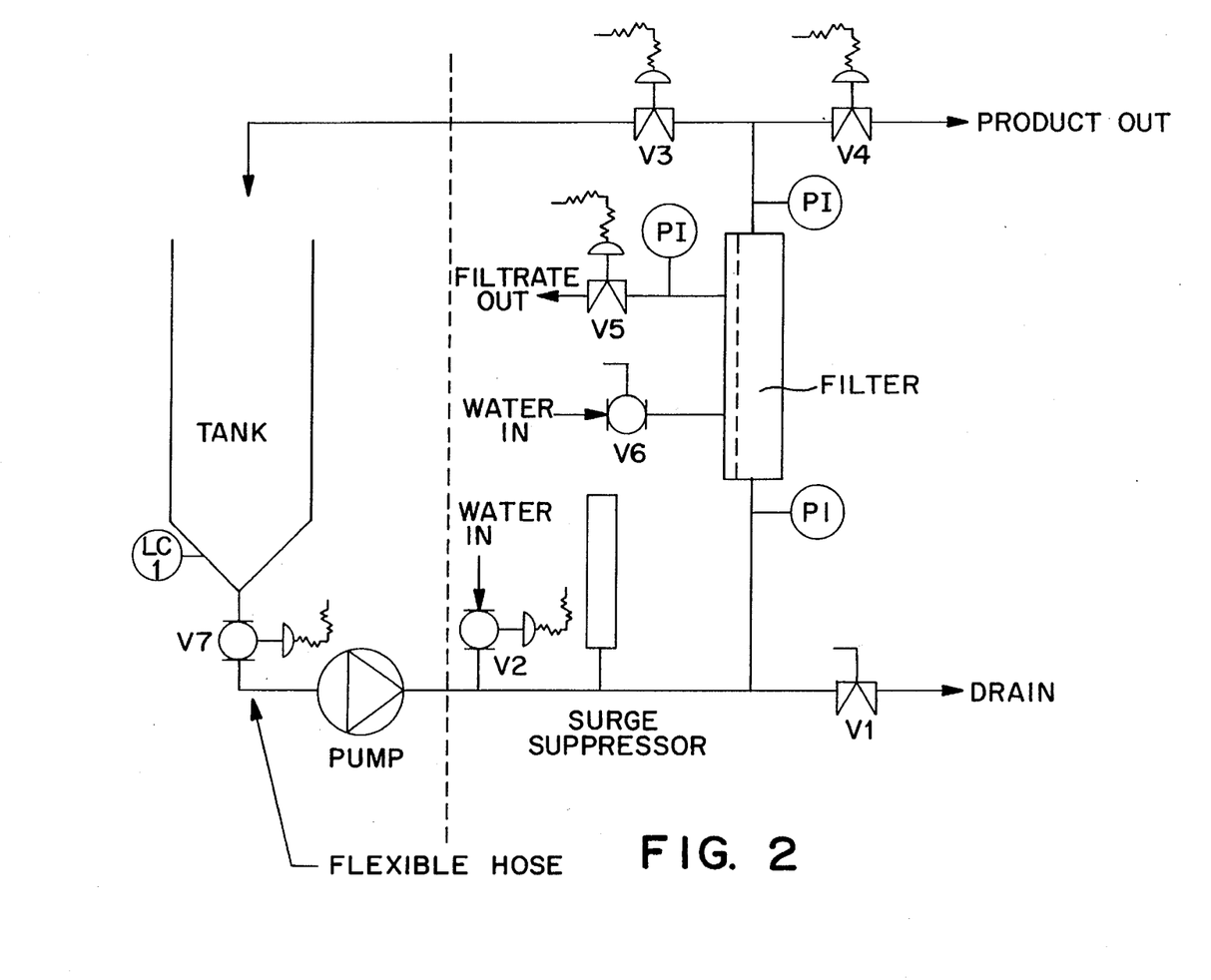
FIG. 2 presents a diagram of the milling operation of the present invention.

About 43338 g of deionized water containing about 1 w/o AG surfactant, manufactured by Cavcomod of Woonsocket, R.I., was added to a semi-continuous polypropylene holding tank and vortex-mixed for 5 minutes to produce a well-stirred dispersion. To this dispersion was added about 1156 g of 5603X High Surface Area yttria, manufactured by Molycorp of White Plains, N.Y.; about 13868 g of Ube E03 silicon nitride; about 8320 g of Ube E05 silicon nitride; and about 5548 g of Ube E10 silicon nitride. The resultant slurry was then mixed in the tank for about 1 hour at high speed. After the 1 hour mixing cycle, the slurry was transferred to a Sweco M18 chamber, manufactured by Sweco, Inc. of Florence, Ky., containing about 76,000 g of half-inch hipped silicon nitride media. See FIG. 2. The transfer was undertaken by constructing a flow circuit from the tank through a pump to the Sweco mill and back to the tank. The tank, pump and Sweco Mill were connected by plastic tubing, an inert plastic tubing having a half-inch inner diameter. Each unit operation shown in the flow circuit of FIG. 2 was connected by this tubing. Sufficient slurry was initially pumped from the tank to fill the Sweco mill to about the middle of the fill port. When the mill was so filled, the pumping ceased, the stainless steel cover of the mill was secured, the mill was turned on, and the pump was restarted. The slurry was milled therein for about 1 hour.

At this point, the slurry was well-dispersed and de-agglomerated. The flow circuit was reconstructed so that the slurry could flow from the tank through a pump to a Model 43XP ferro-filter, manufactured by S. G. Frantz Co. of Trenton, N.J., to the mill to the tank. About 29 g of ammonium citrate (adjusted to a pH of 9.5 with a solution of 70% ammonium hydroxide and 30% deionized water) and about 0.75 g of Mazu DF204 were then added to the slurry. The pH of the tank was then adjusted to about 9.6, using ammonium hydroxide. The slurry was recirculated through the circuit, thus passing through the ferrofilter, for about one hour. The flow was then redirected to its original pattern (i.e., tank to pump to mill to pump) and milling continued.

Samples of the slurry were periodically taken from the circuit in order to determine the mean particle size. When the mean particle size was about 0.67 microns, the milling ceased, the pump was turned off, the stainless steel mill lid was removed, and the slurry was drained into the holding tank.

After the slurry was transferred to the holding tank, the flow circuit was broken between the holding tank and the ferro filter. To the ferro filter exit side was attached, sequentially, a Pall filter cartridge having a 5 micron filter and a Ceraflo cross-flow tank, manufactured by Millipore Corporation of Bedford, Mass. After the cartridge was wetted with deionized water, the pump was turned on, and flow proceeded from the tank to the pump to the ferrofilter to the Pall filter to the crossflow tank.

Next, the slurry was transferred into the cross flow tank, and its pH was adjusted to about 9.7 by ammonium hydroxide addition. The diaphragm pump regulator of the crossflow tank was set at about 80 psi and the pump pulsed at about 1 cycle per second. The top filtrate outlet of the filter tube was opened and clear filtrate exited from the outlet at an initial rate of at least about 1 liter per minute. Filtrate flow decreased as concentration proceeded. After the entire slurry was pumped into the crossflow tank, pump speed increased to about 2 cycles per second and maintained there for about 3 hours.

When the slurry concentrated to about 60 w/o solids and had a specific gravity of about 1.7 g/cc, casting rate tests were performed to determine the CRS of the slurry. Based upon the CRS value obtained, a target slurry concentration was calculated which would result in a CRS of less than about 4 mm²/min. Typically, the target slurry concentration was calculated to be between about 70 w/o and about 72 w/o solids. These target concentrations were achieved by further crossflow filtration.

When the desired slurry concentration was obtained, the crossflow pump was shut off. The hose from the tank outlet was disconnected and the concentrated slurry was pumped into the pressure cast system holding tank. The slurry was kept circulating in the pressure cast system holding tank by using a diaphragm pump (capacity of about 13 kg/m and a maximum pressure of about 100 psig) at a speed of about 2 cycles per second. The pump speed was decreased so that a vortex could not form in the center of the casting tank as the volume of the slip decreased during casting.

The concentrated slurry was then cast in a two piece, single front Plaster of Paris mold having an average pore size of about 2 microns which was soaked in distilled water for about two minutes.

Next, the green body was placed in a furnace having a temperature of about 1450° C. and an atmosphere of nitrogen for about 60 minutes to degas it.

After the green body was degassed, it was subjected to glass encapsulated hipping in accordance with U.S. Pat. No. 4,446,100 having an initial soak of 1840° C. for 20 minutes and a second soak of 1740° C. for about 45 minutes, each soak at 30,000 psi.

After the sintered ceramic is produced, machining is carried out using specifications from ASTM STANDARD C 1161. The machining process involved wet grinding between centers using a CNC grinding machine and two machining steps. In the first step, a resin bonded 180 grit diamond wheel was used to grind the specimen at a 0.001" per pass feed rate, leaving 0.005" stock for finish grinding. In the second step, a resin bonded, 320 grit diamond wheel was used to grind the specimen at a 0.0002" per pass feed rate. In each step, the wheel speed was 5500–7500 SFM and the work speed was 50–200 rpm. The resulting ceramic measured a surface finish of less than about 8 microinches.

After the machining was completed, the machined ceramic was subjected to a temperature of about 1000° C. in an air atmosphere for about 20 hours.

Approximately 320 tensile bars were made in accordance with this Example. The final machined cylindrical buttonhead tensile bars had dimensions set forth in Gerber et al., "Rotor Data Base Generation" CTAHE Semiannual Progress Report for October 1990 through March 1991, pp. 340–361, July 1991, except that the gage diameter was 6.0 +/–0.1 mm. The mechanical properties and microstructures of these ceramics were analyzed.

Toughness was measured in accordance with indentation techniques described in Chantikul et al. "A Critical Evaluation of Indentation Techniques for Measuring Fracture Toughness II: Strength Methods" J. Am. Cer. Soc. 64 (9), pp. 539–544 (1981). Toughness was found to be in the range of between about 6.0 to 6.4 MPa m$^{1/2}$. The average toughness was about 6.2 MPa m$^{1/2}$.

Tensile strength was measured as follows: The cylindrical buttonhead tensile specimens were tested at room temperature on an Instrom Model 8562, manufactured by Instrom Corp. of Canton, Mass., utilizing the Instrom "Super-grip" and straight tri-split copper collet system. A double ramp loading procedure was used to test all specimens. The specimen was initially loaded to about 6668N (1500 lbs) at about 39 MPa/min (250 lbs/min). This allowed time for the fully annealed copper collets to deform to the buttonhead radius of the specimen. After the initial ramp to about 6668N, the specimen was then loaded to failure at a stressing rate of about 600 MPa/min. The load train was checked before testing with an alignment tool for actuator/load cell alignment and a strain gaged tensile specimen for Instrom "Super-grip" alignment.

For the 320 tensile bars which fractured within about one cubic centimeter uniformly stressed gage section, the mean tensile strength was about 997 MPa. The range of the data was from a low value of 540 MPa to a peak value of 1237 MPa. More than 80% of the 320 tensile bars described above had a tensile strength of at least about 900 MPa. About 50% had tensile strength values in excess of 1 GPa.

SEM fractography analysis for this sample set of 320 tensile bars determined the strength distribution to be multimodal with several flaw populations contributing to the strength-defining fast fractures.

Figure 3:
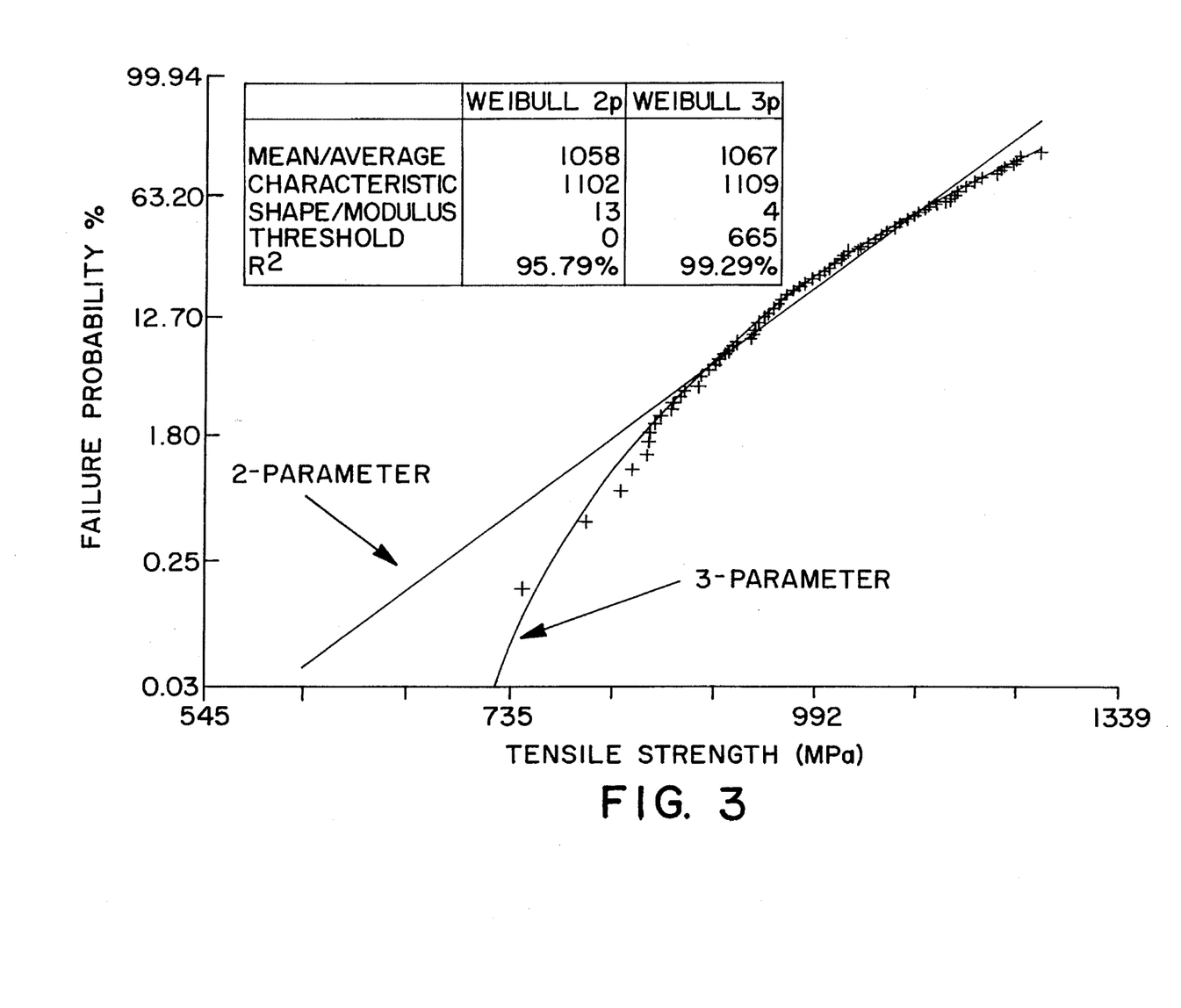
FIG. 3 presents the tensile strength data of the present invention along with 2-parameter and 3-parameter Weibull correlations thereof.

A competing risk analysis was undertaken to determine whether the intrinsic tensile strength data could be better characterized by a 2-parameter or 3-parameter Weibull fit. See FIG. 3. The confidence level ($R^2$) for the 2-parameter model was determined to be 95.79% while that of the 3-parameter model was 99.29%. Thus, the competing risk analysis suggested that the strength distribution associated with process related, intrinsic strength impairing flaws is best represented by a 3-parameter Weibull model. Approximately one half of the data fall into this "intrinsic" category while the other half involved machining damage related failure origins. Set forth below in TABLE 1 are the intrinsic strength data for the 3-parameter Weibull model which exclude failures due to machining damage. As shown in Table 1, the 3-parameter model yields an intrinsic strength threshold equal to about 665 MPa.

TABLE 1

| | 2-Parameter Weibull Model | 3-Parameter Weibull Model |
| --- | --- | --- |
| Mean Tensile Strength (MPa) | 1058 | 1067 |
| Characteristic Tensile Strength (MPa) | 1102 | 1109 |
| Shape/Modulus | 13 | 4 |
| Threshold (MPa) | 0 | 665 |
| $R^2$ | 95.79% | 99.29% |

The microstructure of the ceramics made in accordance with Example 1 were also examined. XRD analysis indicated that between about 20 w/o and about 30 w/o of the silicon nitride grains were alpha, the remainder being beta. Without wishing to be tied to a theory, it is believed that the relatively low sintering temperature combined with a relatively short soak time prevented a higher degree of conversion of the alpha silicon nitride to the beta phase.

Next, grain thicknesses of the beta silicon nitride grain were estimated by the linear intercept method. It was found that at least about 80% of these grains had a thickness of less than about 1 micron.

Third, the average aspect ratio of the silicon nitride grains were investigated. The length and thicknesses of beta grains were estimated by the linear intercept method. The average aspect ratio was about 6. The high aspect ratio grains (i.e., grains having an aspect ratio greater than eight) tended to have thicknesses less than about 0.6 microns.

Figure 4:
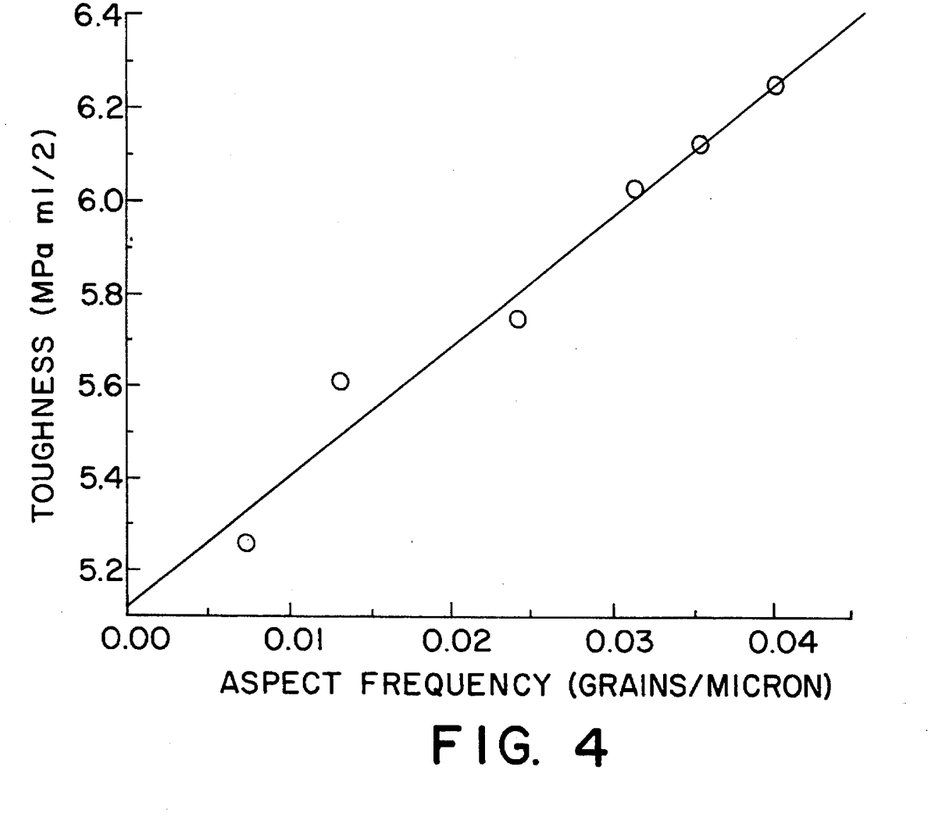
FIG. 4 presents a toughness-aspect frequency correlation characterizing the ceramics of the present invention.

Fourth, the frequency of high aspect ratio grains was estimated. This frequency was computed by counting the number of high aspect ratio grains which appear over a fixed lineal distance. At least about 30 beta grains/mm had a high aspect ratio. According to one toughening theory, the main toughening mechanism in a hipped silicon nitride ceramic is crack deflection, and crack deflection is a function of the frequency of "rods" within the ceramic. Since the aspect frequency estimates are somewhat analogous to rod frequency, toughness was plotted as a function of aspect frequency. See FIG. 4. Regression analysis of the toughness-aspect frequency correlation resulted in a correlation coefficient of about 0.97, indicating a strong correlation between toughness and aspect frequency.

The ceramics of the present invention may be used in conventional silicon nitride applications, including high temperature applications such as the AGT rotor.

We claim:

1. A silicon nitride ceramic comprising:
   a) inclusions no greater than 25 microns in length,
   b) agglomerates no greater than 20 microns in diameter, and
   c) a surface finish of less than about 8 microinches, said ceramic having a four-point flexural strength of at least about 900 MPa.

2. The silicon nitride of claim 1 having no more than 0.4 v/o porosity.

3. The silicon nitride of claim 2 further comprising 4 weight percent sintering aid, as sintering aid oxide.

4. The silicon nitride of claim 3 wherein the sintering aid comprises a rare earth, as rare earth oxide.

5. The silicon nitride of claim 3 wherein the sintering aid consists essentially of a rare earth, as rare earth oxide.

6. The silicon nitride of claim 5 wherein the rare earth is yttrium.

7. The silicon nitride of claim 2 having a toughness of at least about 6.2 MPa m½.

8. The silicon nitride of claim 2 wherein between about 20 v/o and about 30 v/o of the silicon nitride is in the alpha phase.

9. The silicon nitride of claim 8 further comprising at least about 50 w/o beta silicon nitride grains wherein at least about 80 w/o of the beta silicon nitride grains have thickness of less than about 1.0 microns.

10. The silicone nitride of claim 9 wherein at least about 95 w/o of the beta silicon nitride grains have an aspect ratio of at least about 4.

11. The silicon nitride of claim 1 further comprising 4 weight percent sintering aid, as sintering aid oxide.

12. The silicon nitride of claim 11 wherein the sintering aid comprises a rare earth, as rare earth oxide.

13. The silicon nitride of claim 11 wherein the sintering aid consists essentially of a rare earth, as rare earth oxide.

14. The silicon nitride of claim 13 wherein the rare earth is yttrium.

15. The silicon nitride of claim 1 having a toughness of at least about 6.2 MPa m½.

16. The silicon nitride of claim 1 wherein between about 20 v/o and about 30 v/o of the silicon nitride is in the alpha phase.

17. The silicon nitride of claim 16 further comprising at least about 50 w/o beta silicon nitride grains wherein at least about 80 w/o of the beta silicon nitride grains have thickness of less than about 1.0 microns.

18. The silicon nitride of claim 17 wherein at least about 95 w/o of the beta silicon nitride grains have an aspect ratio of at least about 4.

* * * * *